(12) United States Patent
Lee

(10) Patent No.: US 10,186,781 B2
(45) Date of Patent: Jan. 22, 2019

(54) EDGE TYPE DIPOLE ANTENNA STRUCTURE AND PCB INCLUDING THE SAME

(75) Inventor: Gun-Hong Lee, Seoul (KR)

(73) Assignee: NETHOM, Gyeonggi-do (KR)

( * ) Notice: Subject to any disclaimer, the term of this patent is extended or adjusted under 35 U.S.C. 154(b) by 621 days.

(21) Appl. No.: 14/113,042

(22) PCT Filed: May 29, 2012

(86) PCT No.: PCT/KR2012/004200
§ 371 (c)(1),
(2), (4) Date: Oct. 21, 2013

(87) PCT Pub. No.: WO2012/169738
PCT Pub. Date: Dec. 13, 2012

(65) Prior Publication Data
US 2014/0042226 A1    Feb. 13, 2014

(30) Foreign Application Priority Data

Jun. 10, 2011 (KR) .......................... 10-2011-0056486
Oct. 18, 2011 (KR) .......................... 10-2011-0106158
(Continued)

(51) Int. Cl.
*H01Q 9/16* (2006.01)
*G06K 7/00* (2006.01)
(Continued)

(52) U.S. Cl.
CPC ............. *H01Q 9/16* (2013.01); *G06K 7/0008* (2013.01); *H01Q 1/2225* (2013.01); *H01Q 9/285* (2013.01)

(58) Field of Classification Search
USPC ......................................................... 235/449
See application file for complete search history.

(56) References Cited

U.S. PATENT DOCUMENTS

2003/0181229 A1* 9/2003 Forster ............... G06K 19/0723
455/575.7
2004/0008146 A1* 1/2004 Ikegaya .................. H01Q 1/22
343/767
(Continued)

FOREIGN PATENT DOCUMENTS

CN 101159035 A 4/2008
CN 101707887 A 5/2010
(Continued)

OTHER PUBLICATIONS

Pjbevel, Cavity-Backed Slot Antennas, Feb. 2, 2009, https://web.archive.org/web/20090202040802/http://www.antenna-theory.com/antennas/aperture/slot2.php.*
(Continued)

*Primary Examiner* — Michael G Lee
*Assistant Examiner* — David Tardif
(74) *Attorney, Agent, or Firm* — IP Legal Services, LLC

(57) ABSTRACT

The present invention relates to printed circuit board (PCB) tracking technology, specifically to a dipole antenna structure for a radio frequency identification (RFID) tag. More specifically, the present invention relates to an edge type dipole antenna structure is implemented on an extremely small area on the edge of a ground plane provided on the PCB for various kinds of electronic products, and a PCB including the same.

24 Claims, 24 Drawing Sheets

(30) Foreign Application Priority Data

Nov. 24, 2011 (KR) ........................ 10-2011-0123833
May 24, 2012 (KR) ........................ 10-2012-0055483

(51) Int. Cl.
*H01Q 1/22* (2006.01)
*H01Q 9/28* (2006.01)

(56) References Cited

U.S. PATENT DOCUMENTS

| | | |
|---|---|---|
| 2005/0275539 A1 | 12/2005 | Sakama et al. |
| 2006/0001138 A1 | 1/2006 | Sakama et al. |
| 2008/0036673 A1 | 2/2008 | Yamagajo et al. |
| 2008/0252425 A1 | 10/2008 | Okegawa et al. |
| 2009/0021379 A1* | 1/2009 | Zhu ................. G06K 19/07749 340/572.8 |
| 2009/0058658 A1 | 3/2009 | Kai et al. |
| 2010/0219941 A1 | 9/2010 | Pagano et al. |
| 2010/0308118 A1 | 12/2010 | Kataya et al. |
| 2011/0134622 A1 | 6/2011 | Yu et al. |
| 2011/0284643 A1 | 11/2011 | Yamagajo et al. |
| 2013/0027268 A1* | 1/2013 | Ohno ...................... H01Q 9/285 343/818 |
| 2013/0315511 A1* | 11/2013 | Chen ................. G06K 19/07745 383/116 |

FOREIGN PATENT DOCUMENTS

| | | |
|---|---|---|
| CN | 101814157 A | 8/2010 |
| CN | 101953025 A | 1/2011 |
| JP | 2006-018421 A | 1/2006 |
| JP | 2008-148122 A | 6/2008 |
| JP | 2011-059969 A | 3/2011 |
| KR | 10-0705359 B1 | 4/2007 |

OTHER PUBLICATIONS

European Patent Office, Supplementary European Search Report of EP Application No. 12 79 6037, dated Nov. 14, 2014.

* cited by examiner

EDGE TYPE DIPOLE ANTENNA STRUCTURE AND PCB INCLUDING THE SAME

CROSS REFERENCE TO RELATED APPLICATIONS

This application is a National Stage Patent Application of PCT International Patent Application No. PCT/KR2012/004200 (filed on May 29, 2012) under 35 U.S.C. § 371, which claims priority to Korean Patent Application Nos. 10-2011-0056486 (filed on Jun. 10, 2011), 10-2011-0106158 (filed on Oct. 18, 2011), 10-2011-0123833 (filed on Nov. 24, 2011) and 10-2012-0055483 (filed on May 24, 2012), the teachings of which are incorporated herein in their entireties by reference.

TECHNICAL FIELD

The present invention relates, in general, to printed circuit board (PCB) tracking technology and, more particularly, to a dipole antenna structure for radio frequency identification (RFID) tags. Yet more particularly, the present invention relates to an edge type antenna structure which can be provided with a very small size in an edge portion of a ground plane of a PCB for a variety of electronic products, a PCB including the same, and an electronic product management system including the same.

BACKGROUND ART

Electronic products, for example, TVs, mobile phones, computers, portable music players and the like, include at least one printed circuit board (PCB). PCBs for electronic products undergo part assembly and inspection processes for electronic products in a preset fabrication line.

Barcode labels were used as an approach for managing the process of assembling electronic product PCBs (including the inspection process) of the related art. For instance, this method manages all processes including the assembly process by identifying barcodes printed on a barcode label using a scanner and updating the identified barcodes in a management server when one process is completed in the production line.

Describing the foregoing management method using barcode labels, there are restrictions in that the miniaturization of labels is limited, and that labels must be attached to positions where they can be exposed at any time to a scanner. In addition, scanning and processing time that reaches up to several tens of seconds can cause a time delay in the assembly process. If an electronic product PCB is small, trouble occurs in that the barcode label must be detached for the purpose of the parts assembly process and then reattached when the corresponding process is finished. Therefore, the subsequent process is delayed. For reference, the amount of processing time that is uselessly spent can be estimated considering the number of assembly steps and that the processes of attaching and detaching barcode labels are manually performed.

In order to overcome the problem of the barcode system, several electronic product manufacturers introduced radio frequency identification (RFID) tags. As is known, RFID tags are divided into active tags and passive tags depending on the presence of operating power. The active tag has limitations to miniaturization since it must include a power source (e.g. a battery). Accordingly, the passive tag which uses a radio wave radiated from an antenna of an RFID tag reader is widely used.

The passive tag basically includes a tag chip and an antenna. There are two methods of applying the passive tag to the above-mentioned electronic product PCB. One is to attach the RFID tag to the PCB like the barcode label, and the other one is to mount a passive tag on the electronic product PCB. The latter requires the electronic product PCB to be provided with an antenna pattern which is to be connected to the tag chip. This means a space on the PCB corresponding to the size of the antenna is required. It is difficult, however, to provide an antenna pattern space for the tag chip in a PCB of a small electronic product, for example, a portable phone.

As a related art for overcoming this problem, disclosed was United States Patent Application Publication No. US2010/0219941 "SYSTEM, APPARATUS, AND METHOD FOR PCB-BASED AUTOMATION TRACEABILITY" (hereinafter referred to as "'941 patent"). The '941 patent is significant in that a ground plane of a PCB is used as an antenna for a tag. Specifically, the antenna in '941 patent has a structure known as a "slot antenna." As apparent from the figures in '941 patent, a slot formed at a preset length on the ground plane acts as an antenna. However, the length of the slot is required to be about 70 mm when an intended frequency is 900 MHz and an entire frequency wavelength is used and about 35 mm even if half a frequency wavelength is used.

However, considering the trends of PCBs toward small size and high integration that are becoming more demanding every day, the length of the slot has a significant effect on design conditions such as formation of traces (or signal patterns) or arrangement of components. For instance, the slot causes some traces to be designed to take a roundabout path instead of an optimum path. This has an effect over not only that trace but also arrangement of the other traces and components.

DISCLOSURE

Technical Problem

Accordingly, the present invention has been made keeping in mind the above problems occurring in the prior art, and an object of the present invention is to provide an antenna structure, the size of which is reduced compared to that of the related art.

Technical Solution

In order to accomplish the above objects, the present invention provides an edge type dipole antenna structure.

As disclosed in claim 1 of this application, the edge type dipole antenna structure basically includes a slit having a minute length, the slit forming a gap in an edge of a ground plane provided in a PCB; and an expanded portion extending from the slit, the expanded portion imparting inductive reactance to the slit. The optimal shape of the expanded portion may be a circle like a typical coil. A passive RFID tag chip is connected to the slit, and according to an aspect of the invention, the edge of the ground plane acts as a dipole antenna of the tag chip.

Advantageous Effects

According to the present invention, the edge of the ground plane provided in the PCB of an electronic product can be used as the dipole antenna for the tag chip. Therefore, unlike the related art, a space on the PCB for an antenna dedicated to the tag chip is not required.

In addition, the edge type antenna structure disclosed herein can be embodied in a small size.

Furthermore, the PCB in which the edge type dipole antenna structure according to the invention is provided can have wide and various applications, for example, a system which manages the assembly process for electronic products and performs follow-up management such as repair or warranty service (A/S).

The specific features and advantages of the invention will be more apparent from the following description taken in conjunction with the accompanying drawings. Before that, it should be understood that detailed descriptions of known functions and components incorporated herein will be omitted when they may make the subject matter of the present invention unclear. In addition, unless explicitly stated to the contrary, the word "comprise (comprises or comprising)" will be understood that the exclusion of any other elements is not implied and further components can also be included.

MODE FOR INVENTION

Reference will now be made in detail to a PCB including an edge type dipole antenna according to a first embodiment.

Figure 1:
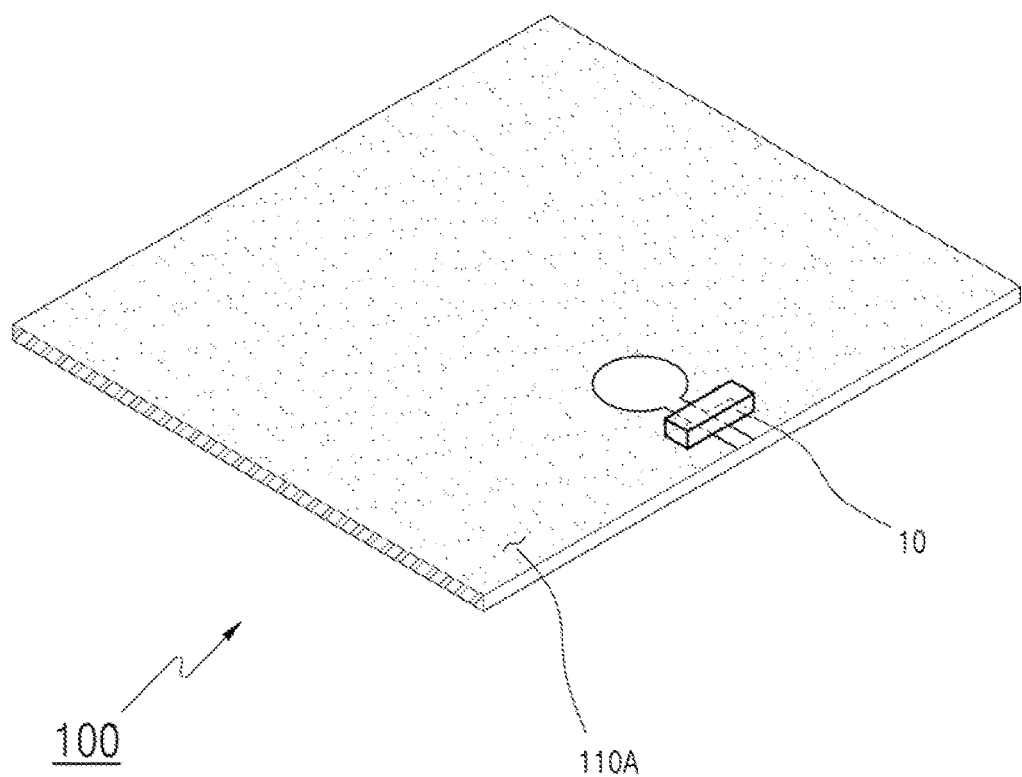
FIG. 1 to FIG. 4 are views illustrating a PCB having an edge type dipole antenna structure according to a first embodiment.

A printed circuit board (PCB) referred to herein is the term of a PCB on at least one surface of which a ground plane is formed and includes a flexible PCB. The PCB 100 according to the first embodiment will be described by simplifying it as including a ground plane 110A provided on one surface, as shown in FIG. 1. The edge type dipole antenna structure described in this embodiment is the basic structure of the invention.

Figure 2:
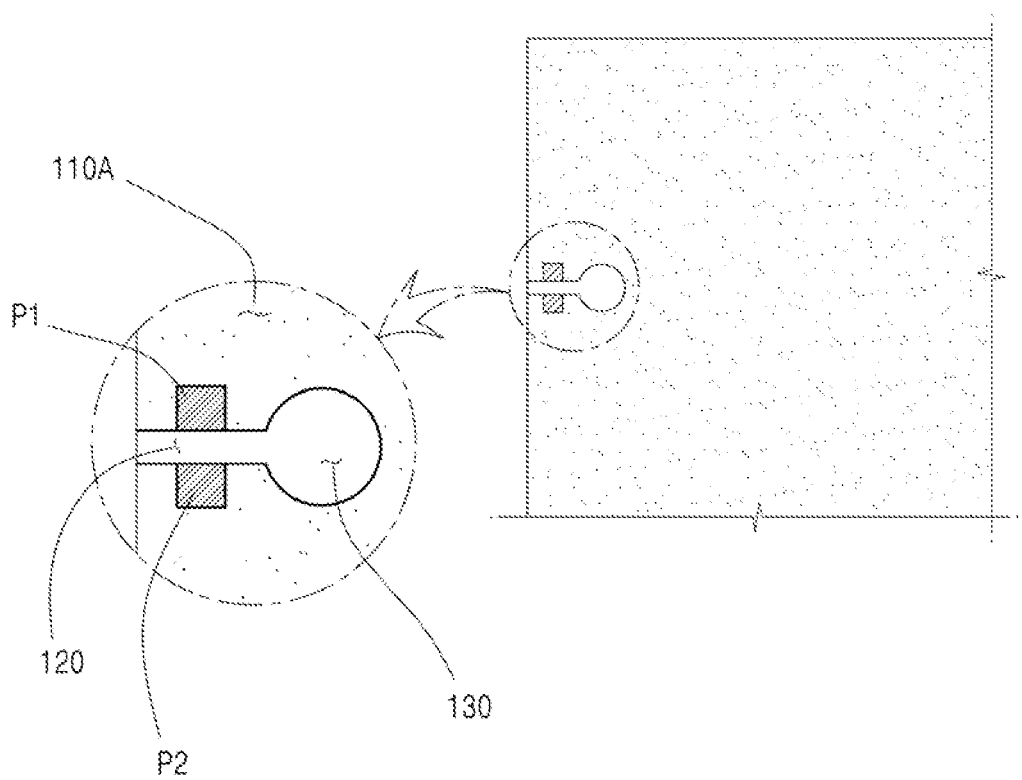

Referring to FIG. 1 and FIG. 2, a slit 120 is formed at one edge 111 of the ground plane 110A provided on the substrate (e.g. FR4) of the PCB 100. The slit 120 has a small length and a gap.

A tag chip 10 is connected to the ground plan 110A, at the gap or across the slit 120. The length "ds" of the slit 120 can have a minimum size such that the tag chip 10 can be connected, for example, the one-direction length of the tag chip 10. Reference numerals P1 and P2 designate pads with which the tag chip 10 is connected to the ground plane 110A through surface mounting.

Figure 3:
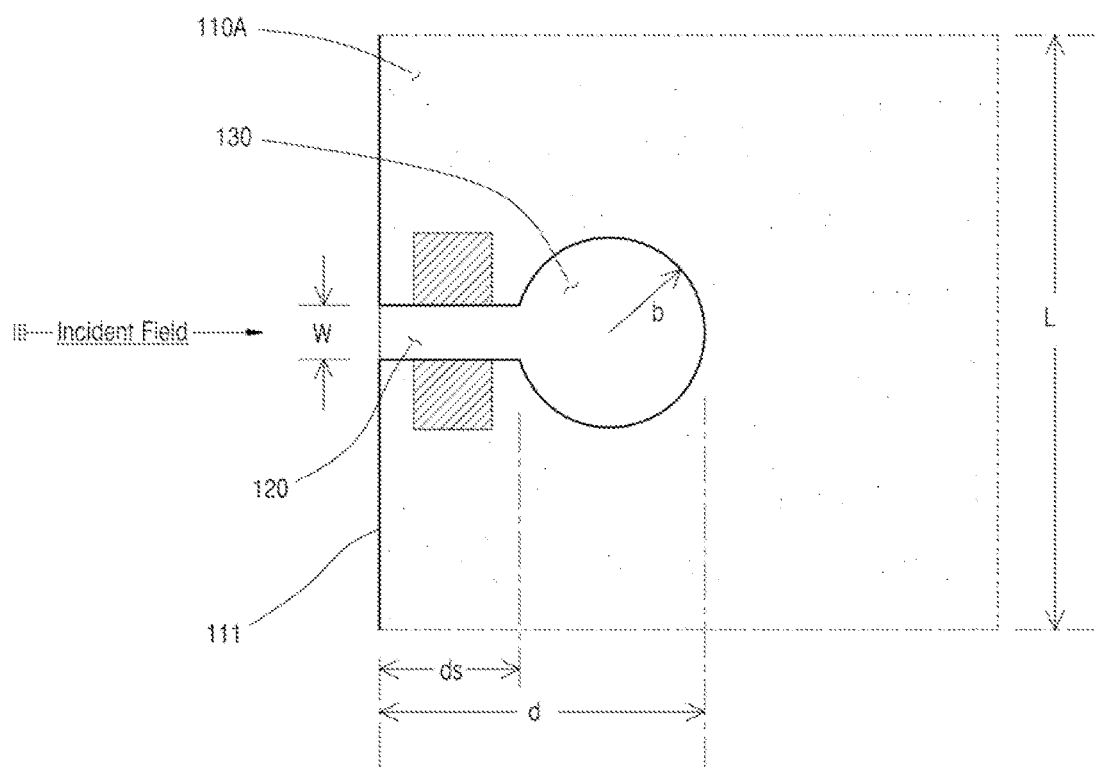

Here, referring to FIG. 3 together, an expanded portion 130 that is wider than the gap "W" of the slit is formed at the extended distal end of the slit 120. The circular expanded portion 130 shown in FIG. 3 provided inductive reactance to the slit 120. In order for the tag chip 10 provided in the slit 120 to optimally operate, the tag chip 10 is required to be supplied with power necessary for the operation of the tag chip from a radio wave radiated from an RFID reader-writer (not shown). (The radio wave can also be understood as power or energy from the reader-writer.)

Figure 4:
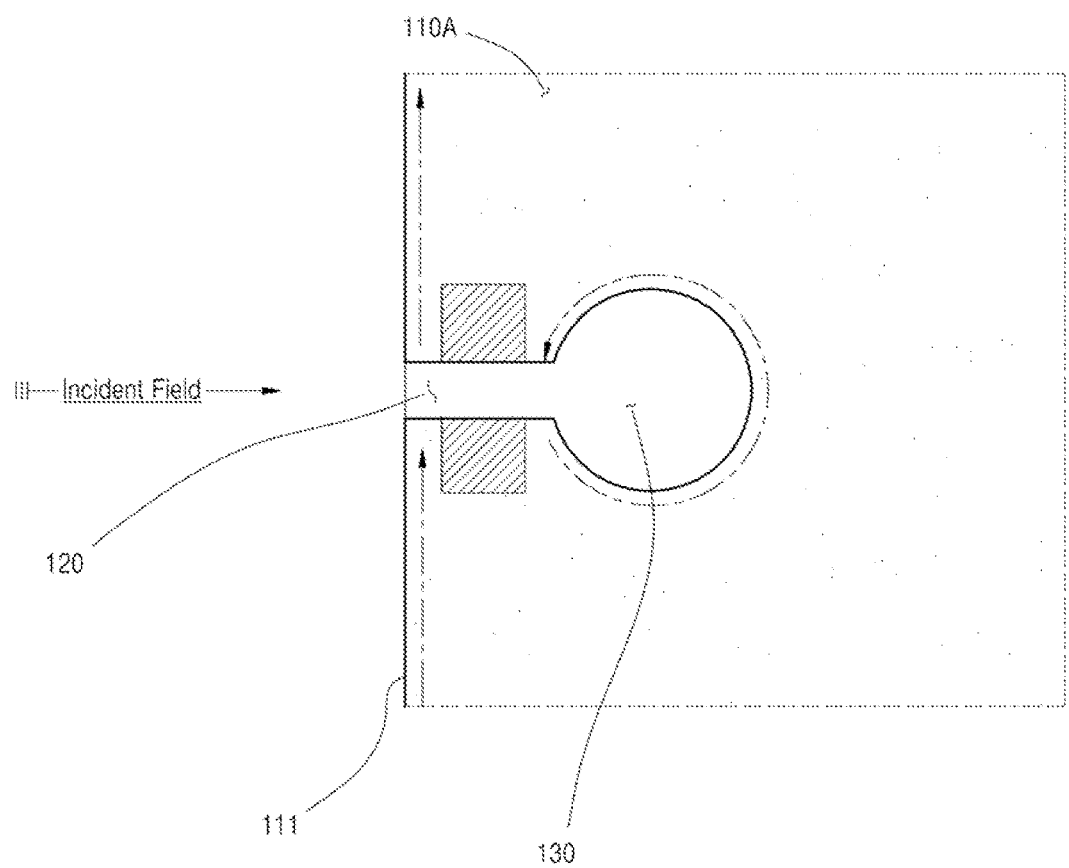

Specifically, referring to FIG. 4, when a radio wave (energy or power) radiated from the reader-writer, for example, a radio wave of 900 MHz, is received in the direction parallel to the ground plane 110A in the direction toward the slit 120 (incident field), a current flows in the longitudinal direction of the edge 111 of the ground plane 110A in which the slit 120 is formed. This current flows along the periphery of the expanded portion 130 via the slit 120. As shown in FIG. 4, when the expanded portion 130 is circular, the current flows in the radial direction. For reference, most of the current flows in vicinity of the edge 111 and the periphery of the expanded portion 130.

The current that flows along the expanded portion 130 generates a magnetic field through the expanded portion 130, and resultant inductive reactance is loaded to the slit 120. Consequently, a common mode voltage is generated at the edge 111 of the ground plane 110A, first from the slit 120. According to features of the invention, the edge 110 acts as "a dipole antenna" of the tag chip 10.

According to one feature of the invention, an inductive reactance value is controlled by the expanded portion 130, and power for activating the tag chip 10 (that can also be understood as "power to be absorbed by the tag chip") can be adjusted. When the expanded portion 130 is circular, the inductive reactance value is controlled due to adjustment in the radius "b." A detailed description will be given below of a specific method of designing the inductive reactance value.

In addition, considering that the expanded portion 130 generates inductive reactance, the optimal shape of the expanded portion 130 is "circular" like a typical coil. However, the expanded portion 130 of the present invention is not limited to the circular shape and can, of course, be modified into shapes other than a circle. For instance, the expanded portion of the present invention can be modified into an oblong shape illustrated in FIG. 5, a polygonal shape illustrated in FIG. 6, and an oval shape.

Figure 7:
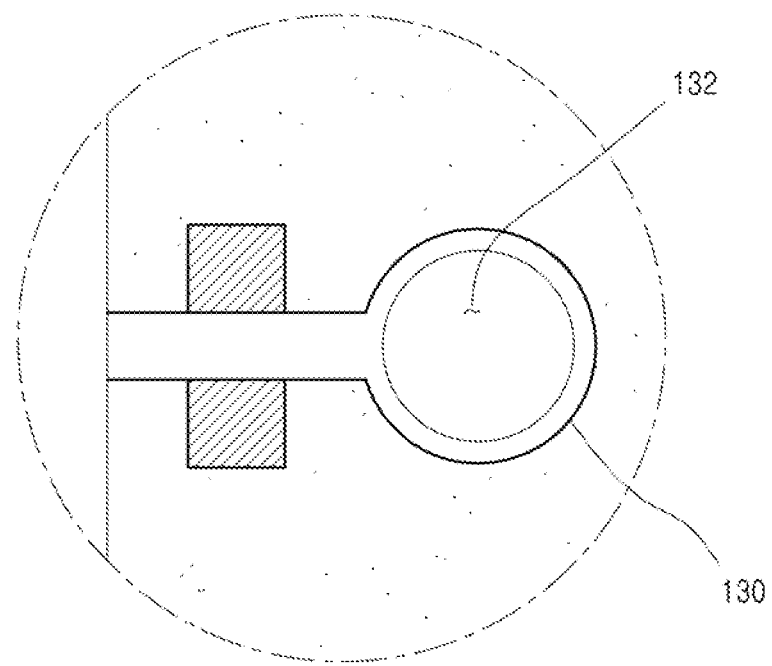

As shown in FIG. 7, a through-hole 132 which penetrates through a PCB 100 may be formed inside the expanded portion 130. The diameter of the through-hole 132 may be smaller than the diameter of the expanded portion 130. For reference, the through-hole 132 can also be configured such that a fixing screw (bolt) intended to fix or support the PCB 100 can be inserted thereinto. In this case, it is preferred that the fixing screw be made of a nonmetal such as plastic.

A description will be given below of a PCB according to a second embodiment of the invention. As described above, the PCB according to the second embodiment has ground planes formed on both surfaces thereof. Herein, for the purpose of discriminating the terms, the ground plane formed on the upper surface of the PCB 100 will be referred to as "the upper-surface ground plane," and the ground plane formed on the undersurface of the PCB 100 will be referred as "the undersurface ground plane." In addition, as for reference numerals for components, the reference numerals of the first embodiment will be used.

Figure 8:
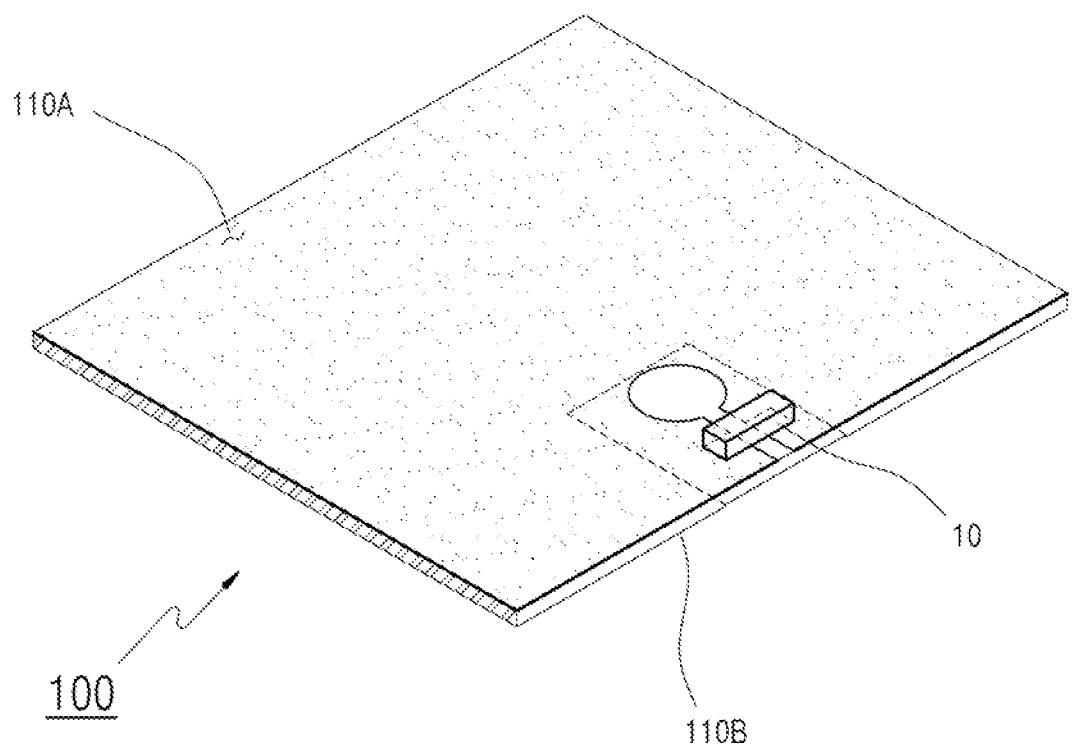
FIG. 8 and FIG. 9 are views illustrating a PCB having an edge type dipole antenna structure according to a second embodiment.
Figure 9:
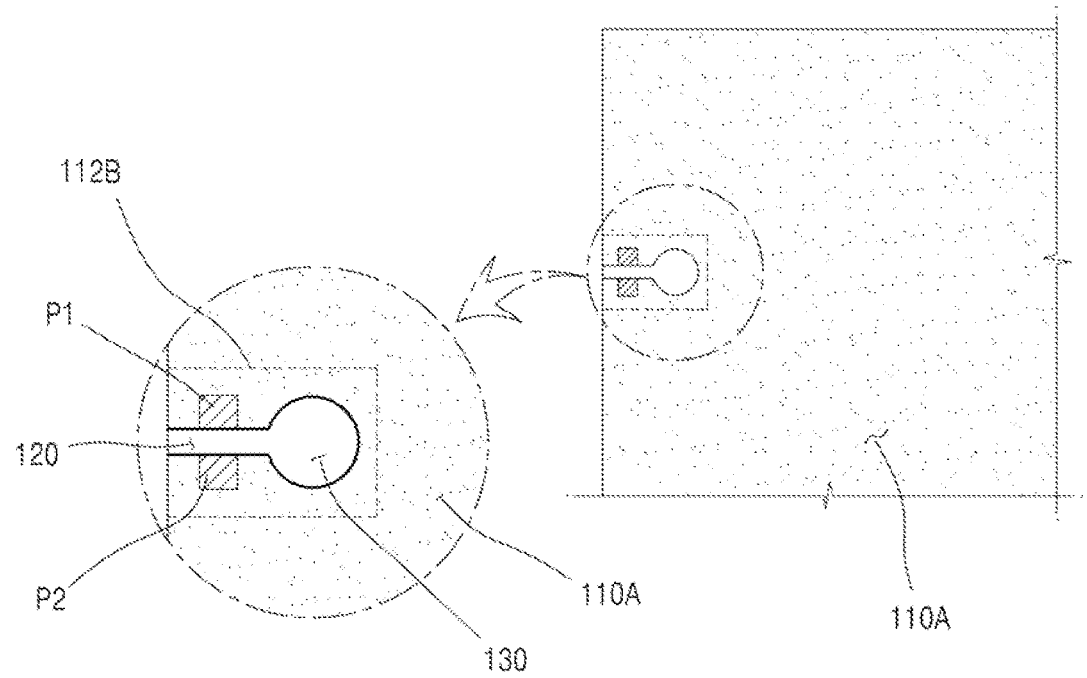

Referring to FIG. 8 and FIG. 9, the PCB 100 includes the upper-surface ground plane 110A and the undersurface ground plane 110B. The upper-surface ground plane 110A includes the slit 120 and the expanded portion 130 illustrated in the first embodiment. The second embodiment is characterized in that a partial portion of the undersurface ground plane 110B corresponding to the slit 120 and the expanded portion 130 forms a removed portion (hereinafter referred to as "the removed portion") 112B.

Figure 10:
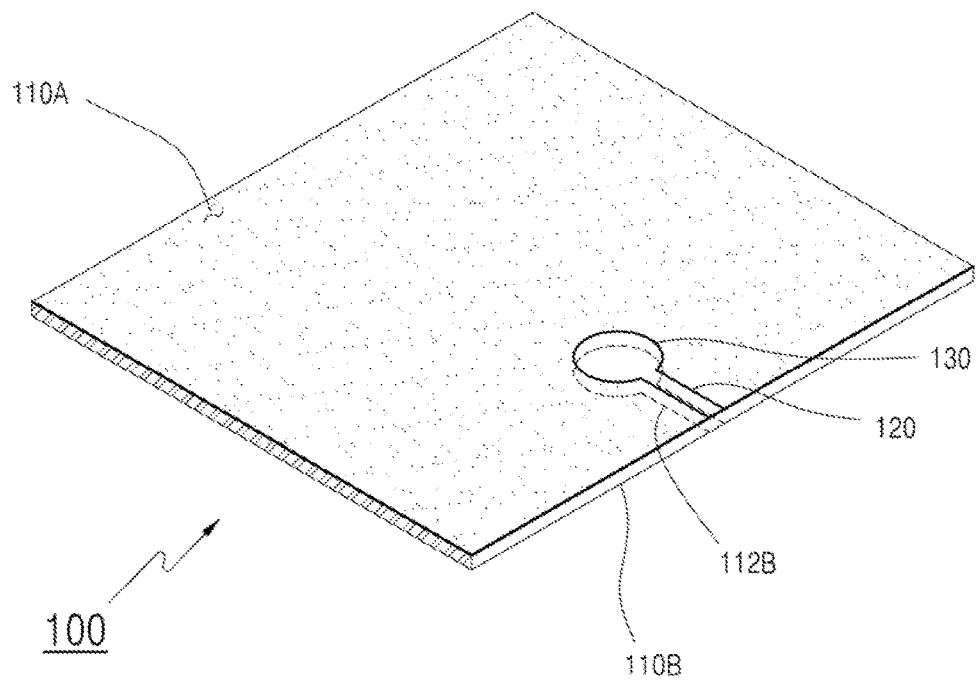
FIG. 10 is a view illustrating the shape of a removed portion according to the second embodiment.

This removed portion 112B is intended to allow a magnetic field generated in the expanded portion 130 to easily pass through the PCB 100, whereby inductive reactance is more efficiently generated. This function of the removed portion 112B basically corresponds to the function of the through-hole 132 illustrated in the first embodiment. Therefore, the area of the removed portion 112B is required to surround at least the expanded portion 130 formed in the upper-surface ground plane 110A. In addition, the removed portion 112B may be smaller or greater than or the same as the area of the expanded portion 130. In addition, the removed portion may be modified so as to surround the entire slit 120 including the expanded portion 130, as shown in FIG. 9, or have the same shape as the slit 120 and the expanded portion 130, as shown in FIG. 10.

Figure 11:
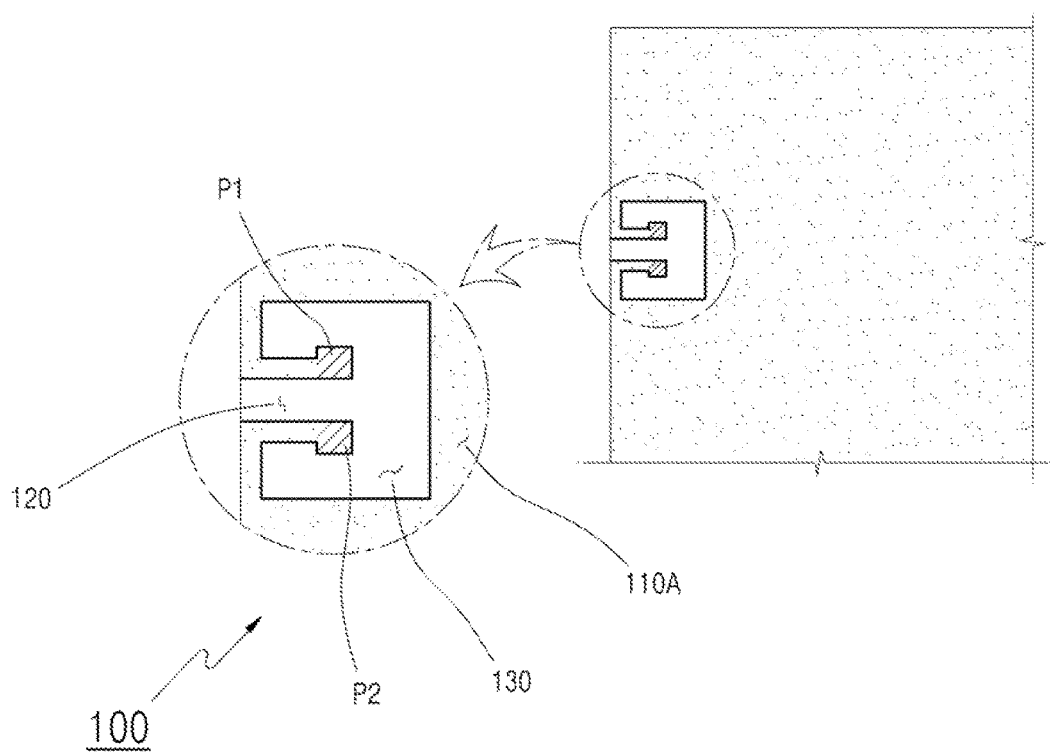
FIG. 11 to FIG. 13 are views illustrating modified embodiments of the first and second embodiments.
Figure 12:
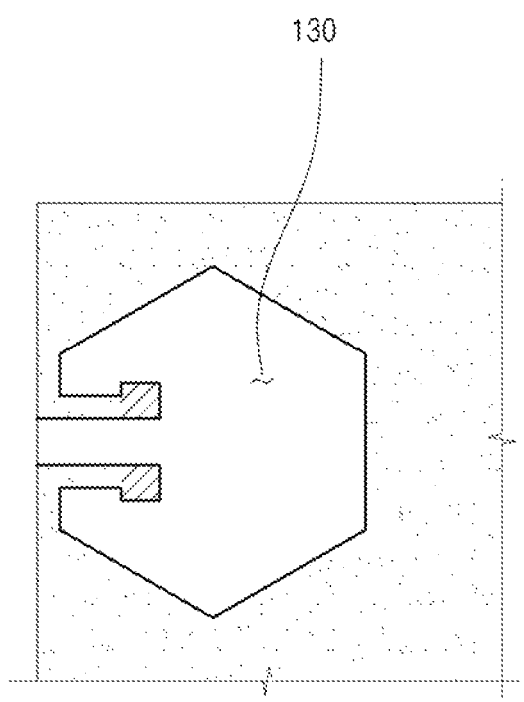
Figure 13:
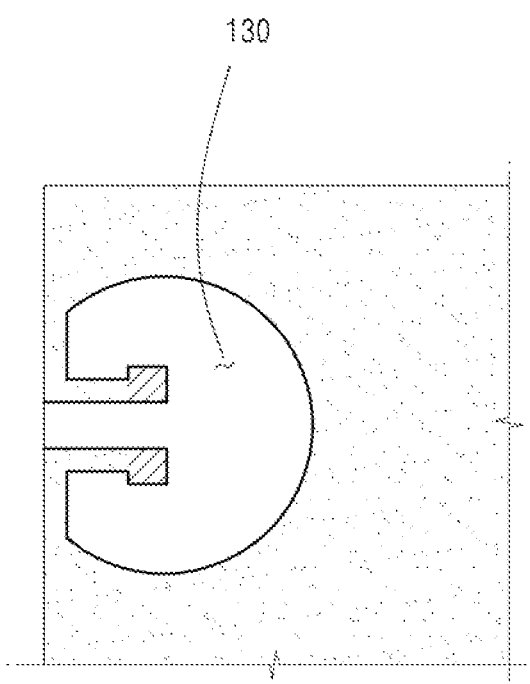

The entire size of the slit 120 and the expanded portion 130 which are components of the edge type dipole antenna structure according to the invention can be modified so as to be smaller than that of the first embodiment and that of the second embodiment. Several modified embodiments will be examined with reference to FIG. 11 to FIG. 14. First, the expanded portion 130 illustrated in FIG. 11 has the shape of an oblong similar to that shown in FIG. 5. This expanded portion differs from FIG. 5 in that the slit 120 overlaps itself inside the expanded portion 130. Therefore, the structure shown in FIG. 11 is smaller than the structure shown in FIG. 5, i.e. the size of the expanded portion 130 shown in FIG. 11 is smaller than the size of the expanded portion shown in FIG. 5. FIG. 12 and FIG. 13 illustrate that the structures are substantially the same as that shown in FIG. 11, except that the shape of the expanded portion 130 can be modified into a polygon or a circle (substantially a semicircle).

A description will be given below of designing of inductive reactance using the expanded portion according to the invention.

Figure 14:
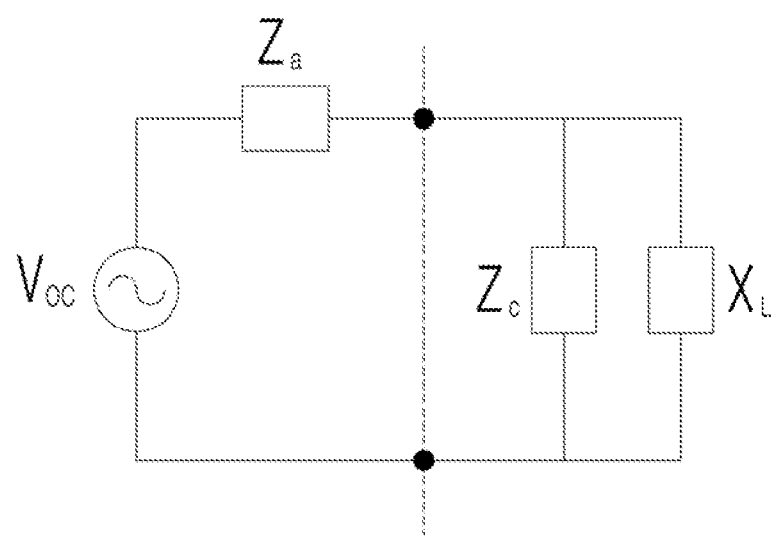
FIG. 14 is an equivalent circuit of an edge type dipole antenna structure according to the present invention.

FIG. 14 is an equivalent circuit of "the edge type dipole antenna structure" according to the present invention. In FIG. 14, a parallel connection between impedance $Z_c$ (assumed to be 25−j45Ω) of the tag chip 10 and inductive reactance $X_L$ due to the expanded portion 130 acts as a load on the dipole antenna. A common mode voltage is generated at a portion of the ground plane in which the slit 120 is formed, i.e. in the longitudinal direction of the edge 111. In order for maximum power to be received in (or absorbed to) the tag chip 10, the reactance $X_L$ must be determined. The reactance $X_L$ depends on input impedance $Z_a$ ($=R_a+jX_a$) of the dipole antenna and the impedance $Z_c$ ($=R_c+jX_c$) of the tag chip 10. In the equivalent circuit shown in FIG. 14, the maximum power transfer condition can be determined by following Formula 1:

$$X_L = \frac{-(R_c^2 + X_c^2 + 2X_aX_c) + \sqrt{(R_c^2 + X_c^2 + 2X_aX_c)^2 - 4(X_a + X_c)(X_aR_c^2 + X_aX_c^2)}}{2(X_a + X_c)} \quad \text{Formula 1}$$

When $X_L$ determined by Formula 1 is loaded on the slit 120, maximum power is received in the tag chip 10 provided on the slit 120.

In addition, the expanded portion 130 according to the invention can be designed to be circular, as shown in FIG. 3. After $X_L$ is determined by Formula 1, the radius "b" of the expanded portion 130 can be produced by obtaining a solution of a transcendental equation from following Formula 2:

$$X_L - 2\pi f b\mu\left[\ln\left(\frac{16b}{a}\right) - 1.75\right] = 0, \quad \text{Formula 2}$$

where "a" refers to the thickness of the ground plane, f refers to the frequency of the reader-writer, and μ refers to the permeability of a dielectric substance. The permeability value is close to 1.

Figure 5:
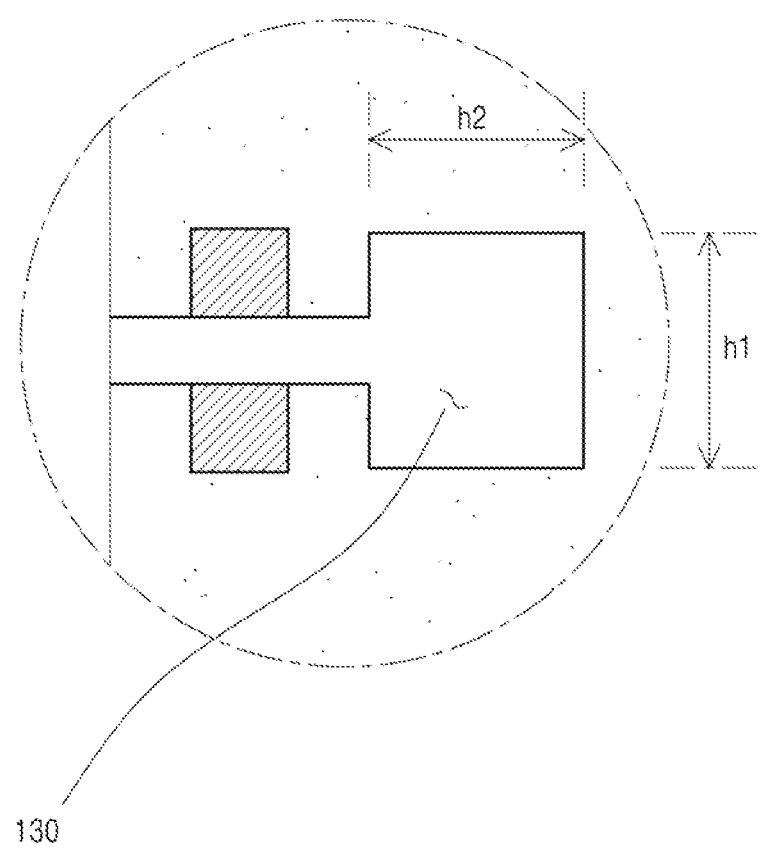
FIG. 5 to FIG. 7 are views illustrating the shape of an expanded portion according to the first embodiment.
Figure 6:
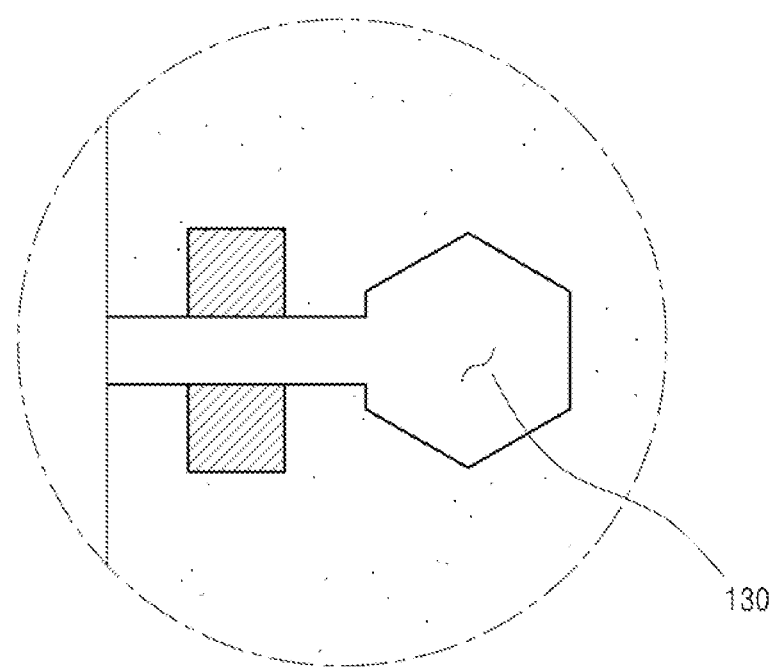

In addition, when the expanded portion 130 is oblong, as shown in FIG. 5, the lengths $h_1$ and $h_2$ of sides can be produced using Formula 3:

$$X_L - 2\pi f \frac{\mu}{\pi}\left[h_2\cosh^{-1}\left(\frac{h_1}{a}\right) + h_1\cosh^{-1}\left(\frac{h_2}{a}\right)\right] = 0 \quad \text{Formula 3}$$

A description will be given below of the results of several simulations that are executed. The impedance $Z_c$ of the tag chip is 25−j45Ω.

Figure 15:
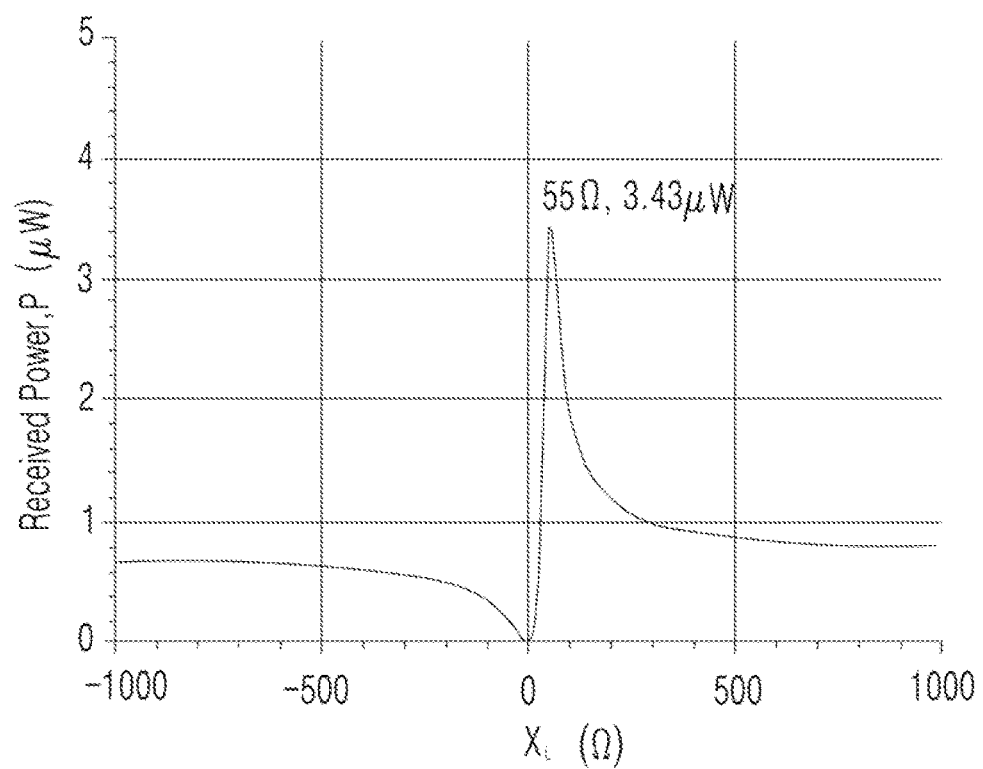
FIG. 15 to FIG. 20 are graphs obtained by simulating the edge type dipole antenna structure according to the invention.
Figure 16:
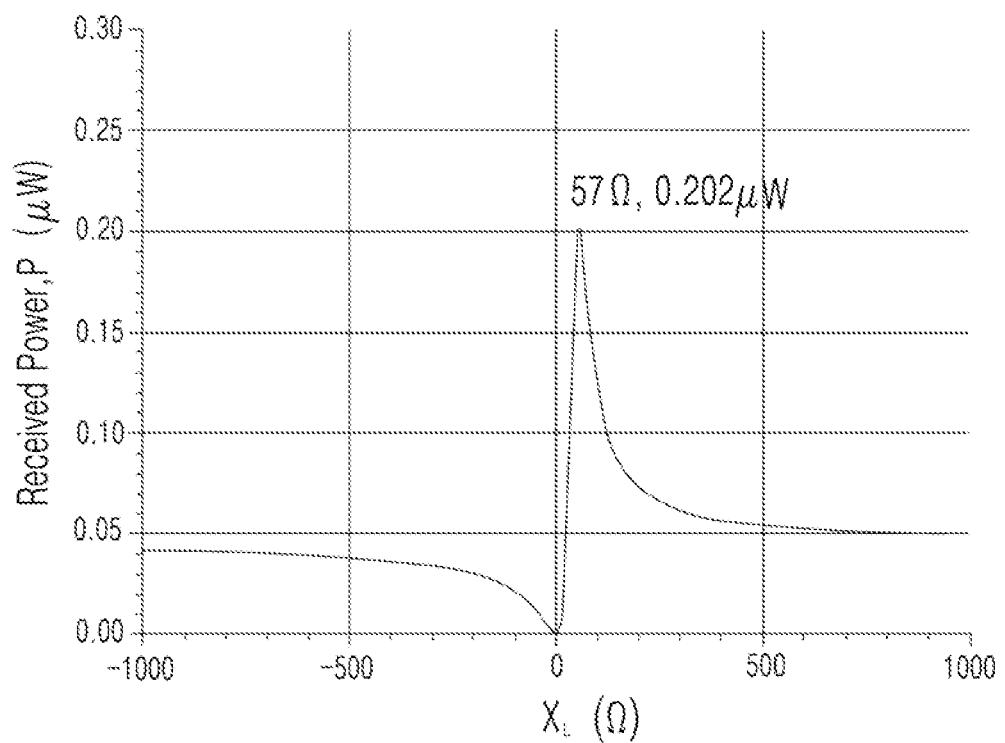

FIG. 15 is a graph showing variations in power received in the tag chip 10 depending on variations in inductive reactance $X_L$ when the length "L" of dipole (length of the edge) is 57 mm. As shown in the graph, when $X_L$ is 55Ω, the maximum amount of power 3.43 μW is received. Referring to FIG. 16, at the dipole length L of 30 mm, when $X_L$ is 57Ω, the maximum amount of power is 0.202 μW. As appreciated from FIG. 15 and FIG. 16, when inductive reactance is loaded on the slit 120, the tag chip 10 receives or absorbs the maximum amount of power. Consequently, the tag chip 10 can communicate with the reader-writer at high efficiency.

Figure 17:
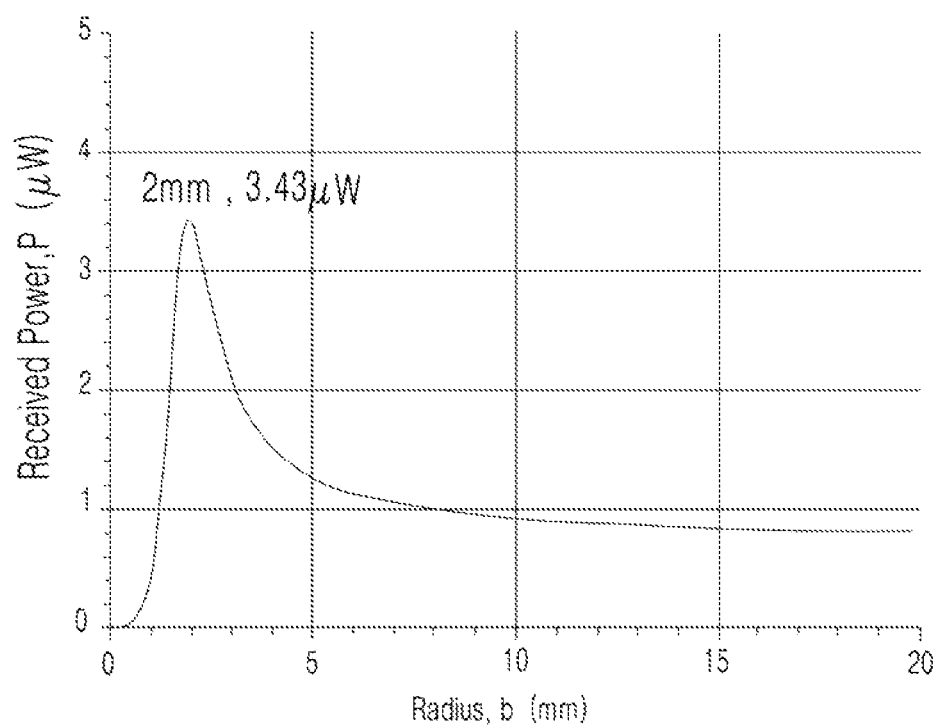
Figure 18:
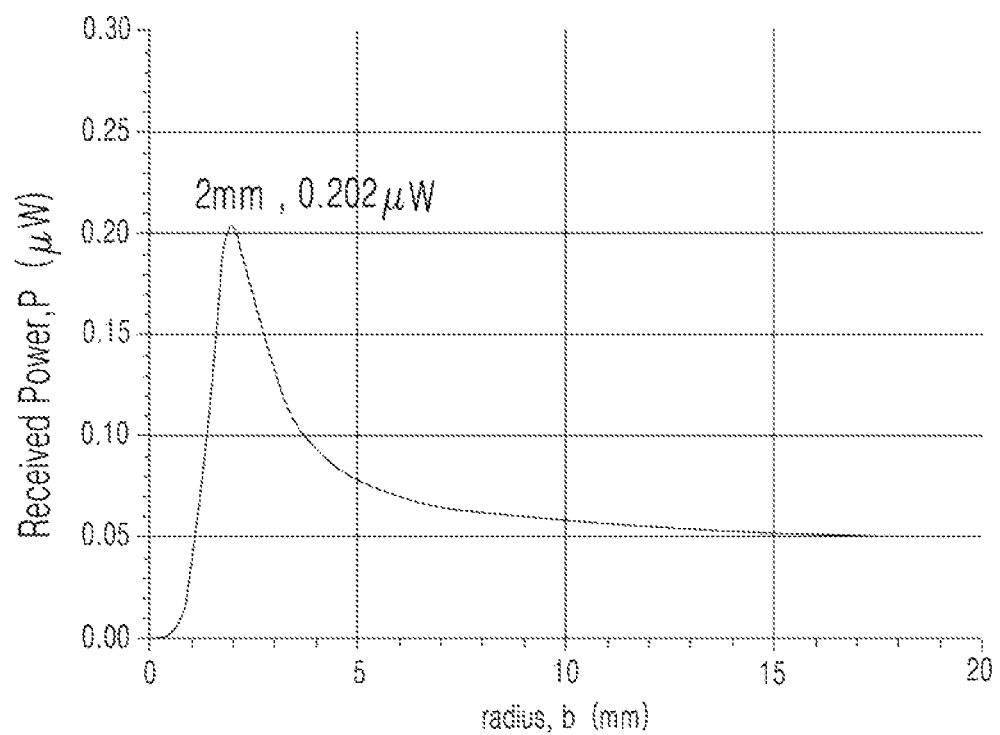

FIG. 17 is a graph showing variations in inductive reactance $X_L$ depending on variation in the radius "b" when the length "L" of the dipole is 57 mm and the expanded portion 130 is circular. When the radius "b" is 2 mm as shown in FIG. 17, it can be appreciated that the maximum amount of power that the tag chip 10 receives is 3.43 μW. In addition, when the length "L" of the dipole is 30 mm and the radius of the expanded portion 130 is 2 mm, the maximum amount of power is 0.202 μW, as shown in FIG. 18. Accordingly, it can be appreciated from FIG. 15 to FIG. 18, when the expanded portion 130 is circular, a variation in the radius "b" of the expanded portion 130 changes the inductive reactance value $X_L$, and the radius "b" at which the tag chip 10 can receive the maximum amount of power can be designed.

Figure 19:
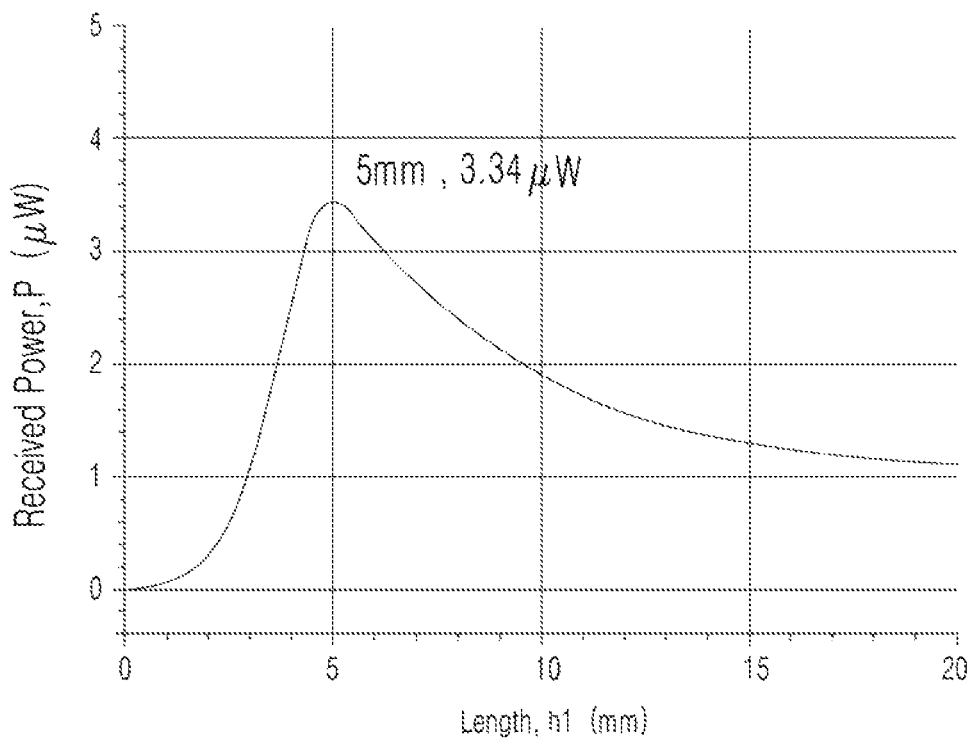
Figure 20:
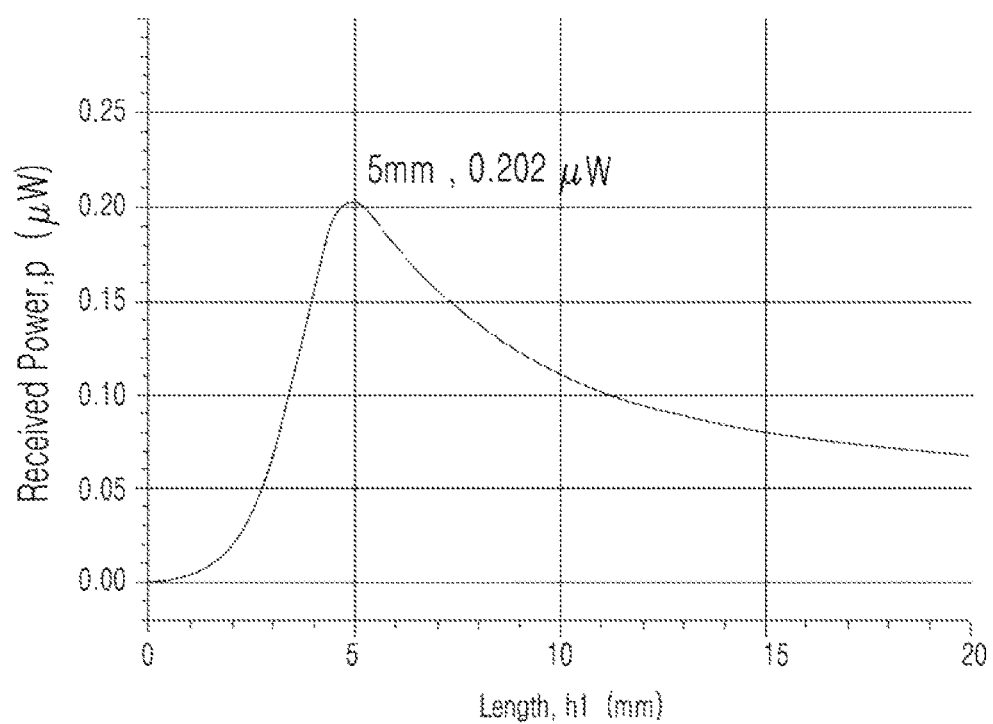

As such, it is possible to design the lengths of the sides $h_1$ and $h_2$ at which the tag chip 10 can receive the maximum amount of power when the expanded portion 130 is not circular and is oblong as shown in FIG. 5. When the dipole length "L" is 57 mm under the condition $h_1=h_2$, the maximum amount of power is 3.43 μW where $h_1=5$ mm, as shown in FIG. 19. When the dipole length "L" is 30 mm, the maximum amount of power is 0.202 μW where $h_1=5$ mm, as shown in FIG. 20. That is, it can be appreciated that, when the expanded portion 130 is oblong, it is possible to design an inductive reactance value at which the tag chip 10 can receive a maximum amount of power by adjusting the lengths of the sides. For reference, the oblong expanded portion 130 has the same inductive reactance value when designed with a greater area than the circular expanded portion. Therefore, when a structure capable of absorbing a maximum amount of power within a small area is required, it is preferred that the expanded portion 130 be designed to be circular.

The inventor carried out an experiment based on the edge type dipole structure shown in FIG. 3. At this time, the gap "W" of the slit 120 was set to 1 mm, the length "ds" of the slit was set to 2 mm, the diameter of the expanded portion 130 was set to 3 mm, and a reader-writer having a frequency of 900 MHz was used. As a result, it was confirmed that the distance at which the tag can detect the reader-writer and vice versa was in the range from 70 to 100 mm. That is, it is appreciated that the edge type dipole antenna according to the invention can be embodied in a significantly small area of 3*5 mm².

The PCB 100 including the foregoing edge type dipole antenna structure can be applied to a system which manages the assembly process for electronic products and performs follow-up management such as repair or warranty service (A/S). More specifically, in FIG. 21, reference numeral "S" indicates an electronic product management system (hereinafter referred to "the system") according to the invention.

Figure 21:
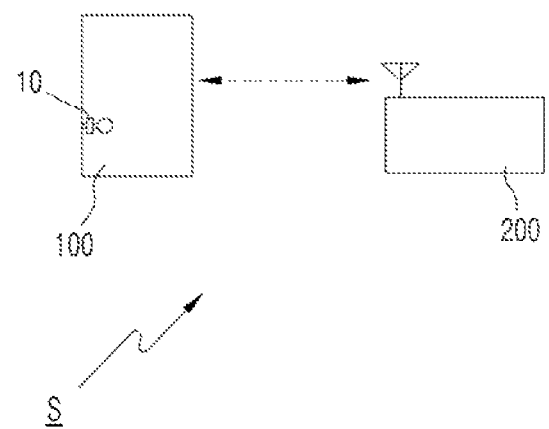
FIG. 21 to FIG. 24 are views illustrating an electronic product management system according to the invention.

As shown in FIG. 21, the system S basically includes the PCB 100 on which the tag chip 10 is provided and at least one reader-writer 200.

The reader-writer 200 can read out information from the tag chip 10 or record information in the tag chip 10 via radio communication at a frequency of 900 MHz. Information recorded in or read out from the tag chip 10 can include identification information of electronic products and varies pieces of information necessary for process management.

Figure 22:
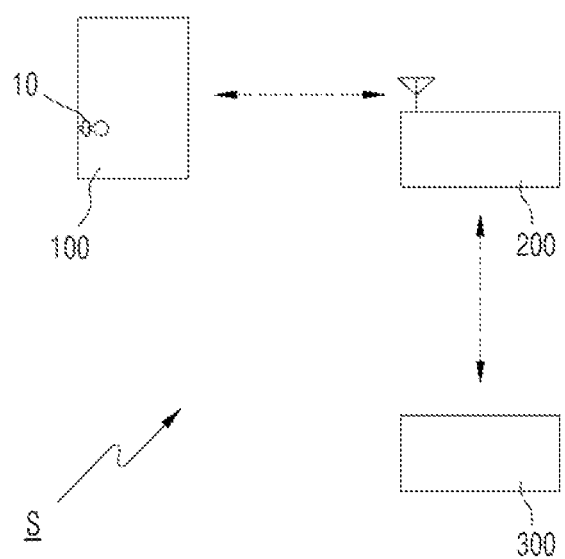
Figure 23:
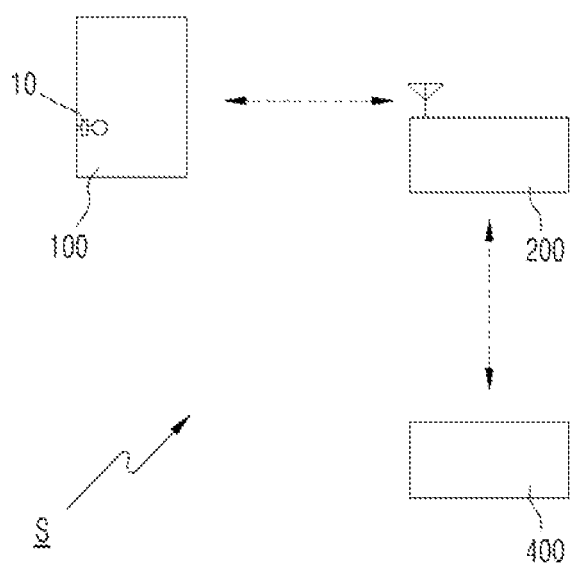
Figure 24:
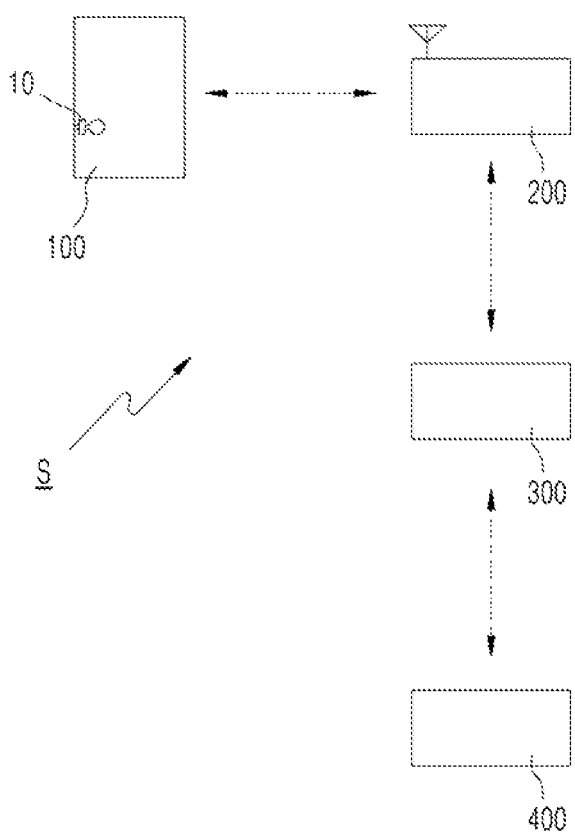

The reader-writer 200 can be connected to a user computer 300 through a wired/wireless network, as shown in FIG. 22, or to a server 400, as shown in FIG. 23. In addition, as shown in FIG. 24, the reader-writer 200 can be connected to the user computer 300, which is connected to the server 400. The server 400 can be a management server which manages information about electronic products or a database management system (DBMS).

The foregoing descriptions have been presented for the purposes of illustration of the technical principle of the present invention. They are not intended to be exhaustive or to limit the invention to the precise forms disclosed. Many modifications and variations are apparent to a person having ordinary skill in the art. Therefore, such all suitable modifications, corrections and equivalents shall be understood to fall within the scope of the invention.

INDUSTRIAL APPLICABILITY

As set forth above, the edge type dipole antenna structure disclosed herein can be embodied as a small structure in a PCB of an electronic product and be widely used for process management over the PCB and follow-up management such as repair or warranty service.

The invention claimed is:

1. An edge type dipole antenna structure embodied in a printed circuit board (PCB) of an electronic product, comprising:
a slit having a gap formed in an edge of a ground plane of the PCB such that the edge of the ground plane acts as a dipole antenna of a tag chip in a longitudinal direction of the edge; and
an expanded portion extending from the slit, the expanded portion imparting inductive reactance to the slit,
wherein the tag chip is connected to the slit; and
wherein a dimension of the expanded portion associated with the inductive reactance is determined based on a relationship between power transferred to the tag chip and the dimension of the expanded portion such that a desired power is transferred to the tag chip.

2. The edge type dipole antenna structure according to claim 1, wherein the expanded portion has a shape of one selected from among a circle, an oval and a polygon.

3. The edge type dipole antenna structure according to claim 1, wherein a length of the slit is at least a one-directional length of the tag chip.

4. The edge type dipole antenna structure according to claim 1, wherein the expanded portion has a through-hole formed therein.

5. The edge type dipole antenna structure according to claim 1, wherein the slit overlaps itself inside the expanded portion.

6. A printed circuit board (PCB) of an electronic product in which a ground plane is provided on one surface of the PCB, comprising:
a slit having a gap formed in an edge of the ground plane such that the edge of the ground plane acts as a dipole antenna of a tag chip in a longitudinal direction of the edge; and
an expanded portion extending from the slit, the expanded portion imparting inductive reactance to the slit,
wherein the tag chip is connected to the slit; and
wherein a dimension of the expanded portion associated with the inductive reactance is determined based on a relationship between power transferred to the tag chip and the dimension of the expanded portion such that a desired power is transferred to the tag chip.

7. The PCB according to claim 6, wherein the expanded portion has a shape of one selected from among a circle, an oval and a polygon.

8. The PCB according to claim 6, wherein a length of the slit is at least a one-directional length of the tag chip.

9. The PCB according to claim 6, wherein the expanded portion has a through-hole formed therein.

10. The PCB according to claim 6, wherein the slit overlaps itself inside the expanded portion.

11. A printed circuit board (PCB) of an electronic product in which an upper-surface ground plane and an undersurface ground plane are provided on the PCB, comprising:
a slit having a gap formed in an edge of the upper-surface ground plane such that the edge of the upper-surface ground plane acts as a dipole antenna of a tag chip in a longitudinal direction of the edge; and
an expanded portion extending from the slit, the expanded portion imparting inductive reactance to the slit,
wherein the tag chip is connected to the slit; and
wherein a dimension of the expanded portion associated with the inductive reactance is determined based on a relationship between power transferred to the tag chip and the dimension of the expanded portion such that a desired power is transferred to the tag chip.

12. The PCB according to claim 11, wherein the expanded portion has a through-hole formed therein.

13. The PCB according to claim 11, wherein the expanded portion has a shape of one selected from among a circle, an oval and a polygon.

14. The PCB according to claim 11, wherein a length of the slit is at least a one-directional length of the tag chip.

15. The PCB according to claim 11, further comprising a removed portion formed in a predetermined portion of the undersurface ground plane that corresponds to the expanded portion.

16. The PCB according to claim 11, further comprising a removed portion in a predetermined portion of the undersurface ground plane that corresponds to the slit and the expanded portion.

17. The PCB according to claim 16, wherein a shape of the removed portion is identical with a shape of the slit and the expanded portion.

18. The PCB according to claim 11, wherein the slit overlaps itself in the expanded portion.

19. A printed circuit board (PCB) of an electronic product comprising an edge type dipole antenna structure,
wherein the edge type dipole antenna structure comprises:
a slit having a gap formed in an edge of a ground plane of the PCB such that the edge of the ground plane acts as a dipole antenna of a tag chip in a longitudinal direction of the edge; and
an expanded portion extending from the slit, the expanded portion imparting inductive reactance to the slit,
wherein the tag chip is connected to the slit; and
wherein a dimension of the expanded portion associated with the inductive reactance is determined based on a relationship between power transferred to the tag chip and the dimension of the expanded portion such that a desired power is transferred to the tag chip.

20. A system comprising:
a printed circuit board (PCB) of an electronic product in which a ground plane is provided on one surface of the PCB,
wherein the PCB comprising:
a slit having a gap formed in an edge of the ground plane such that the edge of the ground plane acts as a dipole antenna of a tag chip in a longitudinal direction of the edge; and
an expanded portion extending from the slit, the expanded portion imparting inductive reactance to the slit,
wherein the tag chip is connected to the slit, and a dimension of the expanded portion associated with the inductive reactance is determined based on a relationship between power transferred to the tag chip and the dimension of the expanded portion such that a desired power is transferred to the tag chip; and
a reader-writer which communicates with the tag chip in the PCB through a wireless means.

21. The system according to claim 20, further comprising a user computer connected to the reader-writer through a wired or wireless network.

22. The system according to claim 20, further comprising a server connected to the reader-writer through a wired or wireless network.

23. The system according to claim 21, further comprising a server connected to the user computer through a wired or wireless network.

24. A system comprising:
a printed circuit board (PCB) of an electronic product in which an upper-surface ground plane and an undersurface ground plane are provided on the PCB,
wherein the PCB comprising:
a slit having a gap formed in an edge of the upper-surface ground plane such that the edge of the upper-surface ground plane acts as a dipole antenna of a tag chip in a longitudinal direction of the edge; and
an expanded portion extending from the slit, the expanded portion imparting inductive reactance to the slit,
wherein the tag chip is connected to the slit, and a dimension of the expanded portion associated with the inductive reactance is determined based on a relationship between power transferred to the tag chip and the dimension of the expanded portion such that a desired power is transferred to the tag chip; and
a reader-writer which communicates with the tag chip in the PCB through a wireless means.

* * * * *